Feb. 13, 1962 R. J. CLAPP ETAL 3,020,596
METHOD FOR FREE FORMING OF STRETCHED SHEET MATERIAL
Filed Sept. 19, 1960 4 Sheets-Sheet 1

ROBERT J. CLAPP,
JOHN E. JAMESON,
INVENTORS

BY Lyon+Lyon
ATTORNEYS

Feb. 13, 1962    R. J. CLAPP ETAL    3,020,596
METHOD FOR FREE FORMING OF STRETCHED SHEET MATERIAL
Filed Sept. 19, 1960    4 Sheets-Sheet 2

CLAMP FRAME

MODIF. CLAMP FRAME
WITH RESTRAINER

ROBERT J. CLAPP,
JOHN E. JAMESON,
INVENTORS

BY Lyon & Lyon
ATTORNEYS

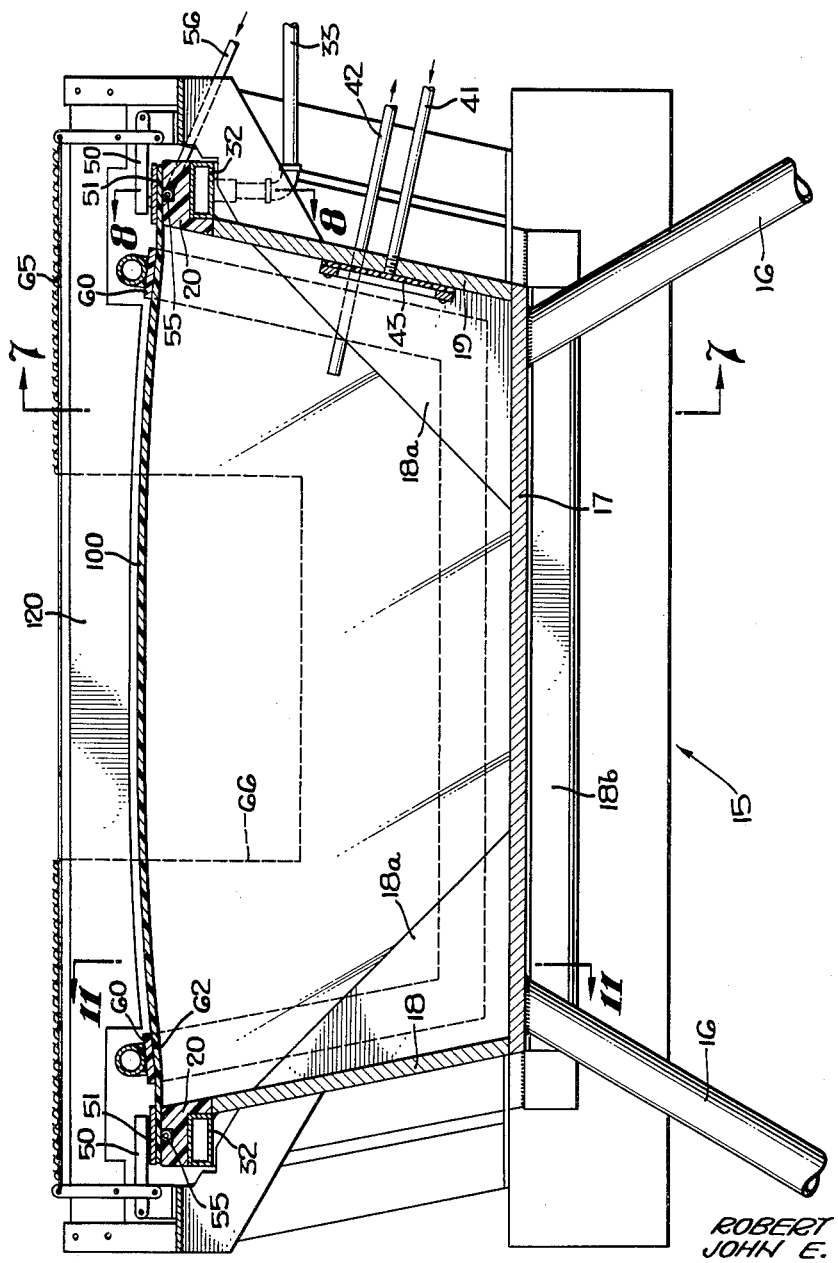

Feb. 13, 1962    R. J. CLAPP ETAL    3,020,596
METHOD FOR FREE FORMING OF STRETCHED SHEET MATERIAL
Filed Sept. 19, 1960    4 Sheets-Sheet 4

ROBERT J. CLAPP,
JOHN E. JAMESON,
INVENTORS

BY Lyon & Lyon
ATTORNEYS

United States Patent Office 3,020,596
Patented Feb. 13, 1962

3,020,596
METHOD FOR FREE FORMING OF STRETCHED SHEET MATERIAL
Robert J. Clapp, Downey, and John E. Jameson, Buena Park, Calif., assignors to Swedlow Inc., Los Angeles, Calif., a corporation of California
Filed Sept. 19, 1960, Ser. No. 59,137
14 Claims. (Cl. 18—56)

This invention relates to the fabrication of plastics in sheet form, and has particular reference to a process for forming stretched thermoplastic sheet material.

This is a continuation-in-part of our co-pending application Serial No. 677,870, filed August 13, 1957, now abandoned.

Recent advances in the production of aircraft glazing materials include the development of stretched monolithic sheet materials made of transparent thermoplastics. These stretched sheets have improved properties of toughness and resistance to crazing and fracturing. By subjecting thermoplastic sheets to linear stretching under certain conditions, the shatter-resistant properties of the sheets are improved, due apparently to the fact that a laminar structure is set up in the sheet. The stretching operation results in a material having shatter-resistant properties similar to that of laminated sheeting such as conventional "safety glass" without suffering the weight penalty of the laminated products. Thus, stretched transparent plastics present a new material which is especially suitable for use in aircraft glazing applications where low weight plays an extremely important part.

Suitable techniques have heretofore been developed for stretching thermoplastic sheeting, either "biaxially," i.e., in two, mutually perpendicular directions, or "multi-axially," i.e., in a plurality of directions extending radially outwardly from the center of the sheet, and in this specification the term "stretched" or similar terms is intended to comprehend either of such types of stretching. However, many problems have arisen in connection with the production of stretched materials formed to the curved contours usually required in aircraft glazing applications. One of the principal objects of this invention is, therefore, to provide a novel method for forming stretched thermoplastic sheeting into desired curved configuration.

In the copending application of Robert J. Clapp et al., Serial No. 543,499, filed October 28, 1955, on Process for Forming of Stretched Sheet Material are disclosed methods for forming stretched thermoplastic sheets into curved configurations. The methods disclosed therein have proven to be of great value in the production of formed parts of stretched materials, but have been limited to the production of somewhat simple contours. An important object of the present invention is to provide a novel process and apparatus constituting an improvement on the process of said Clapp et al. invention.

More specifically, it is an object of the present invention to provide a novel process for forming stretched thermoplastic materials into compound curves of the most difficult shape yet having excellent optical properties, such as that required for aircraft canopies and the like.

Other objects and advantages of this invention, it is believed, will be readily apparent from the following detailed description of preferred embodiments thereof, when read in connection with the accompanying drawings.

In the drawings:

FIGURE 6 is a sectional elevation taken substantially on the line 6—6 of FIGURE 7.

Figure 1:
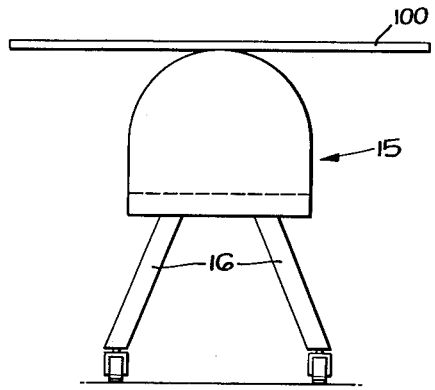
FIGURE 1 is a diagrammatic end elevation of the apparatus of the present invention, illustrating the initial step in carrying out the process of the invention.

The process of the aforesaid Clapp et al. application Serial No. 543,499 (now United States Patent No. 2,897,-546) includes the discovery that flat stretched thermoplastic sheeting can be formed to simple or compound curved configurations by mechanically forcing the stretched sheet to conform to the desired curved configuration and holding the sheet in this position while heating the sheet to a temperature high enough to relieve the strains imposed by the mechanical forming operation, and preferably closely approaching, but not substantially above, a critical temperature at which substantial shrinkage of the thermoplastic would take place. The following quotation from said copending application Serial No. 543,499 is believed to be necessary to the understanding of the present invention:

"It has been found that during the stretching operation, residual stresses are set up in the sheet and that if the sheet is warmed to the forming or thermoplastic temperature of the particular thermoplastic material used, the sheet will completely 'shrink-back,' i.e., return to its original, as-cast dimensions. It has further been found that the relationship between temperature and amount of shrink-back is such that there is a critical temperature, for any given thermoplastic material, at which appreciable shrink-back begins and that, while this temperature is below the normal forming or thermoplastic temperature for that particular material, it is of considerable magnitude, relative to room temperatures. In other words, it has been found that an appreciable degree of heat may be applied to the stretched material before an amount of shrink-back takes place which could be considered to be significant with respect to causing loss of toughness in the stretched sheet. It has been found, also, that superior results are obtained if the temperature of the part be raised, while it is in the restrained, contoured configuration, to a temperature such that a small amount of shrink-back takes place. It is believed that this induced shrink-back of the material plays a part, at least, in 'locking' the thermoplastic into the desired curved configuration. This temperature, as indicated above, varies depending upon the particular thermoplastic material being utilized, but it has been found that best results are obtained if the temperature is maintained in a range such as to produce a measurable amount of shrink-back in a flat stretched specimen but no more than about 3 percent shrinkage. By the term 'percent shrinkage' and similar terms used herein is meant an amount of lineal shrink-back of a flat specimen heated to the same temperature as the part being formed, based on the dimension of the flat stretched specimen.

\* \* \* \*

"As indicated above, the actual forming temperature varies, depending primarily upon the type of thermoplastic material being operated. In order to obtain relatively simple contours, the temperature may be quite low—no more than is required to relieve the externally induced stresses set up by the mechanical forming of the sheet. However, the optimum temperature appears to be just at or slightly below the critical temperature at which appreciable shrink-back begins. For example, in the case of stretched cast polymethyl methacrylate such as stretched 'Plexiglas' II (Rohm & Haas) or its equivalent, specified as stretched MIL–P–5425A, the optimum forming temperature is about 185° F. The optimum forming temperature for stretched, modified (partially cross-linked) polymethyl methacrylate such as stretched 'Plexiglas' 55 (Rohm & Haas) or its equivalent, specified as stretched MIL–P–8184, is 215° F. The preferred forming temperature for stretched polymethyl alpha-chloracrylate such as stretched 'Gafite' (General Aniline & Film Corp.) or its equivalent, specified as MIL–P–8427 (USAF tentative), is 245° F. By way of comparison, normal forming temperature for as-cast 'Plexiglas' II is above 275° F.; 'Plexiglas' 55, above 300° F.; and 'Gafite,' above 350° F."

The process of the present invention comprises an improvement on the aforesaid process in that it preferably utilizes the steps of such process in an initial forming operation, followed by a free forming operation in which a differential in air pressure between internal and external sides of the sheet is utilized to form the sheet to the desired final contour. The process of the present invention comprehends within its scope the discovery that such a free forming operation is made possible by raising the temperature of the stretched and pre-formed sheet to a point substantially below the normal forming or thermoplastic temperature of the particular thermoplastic used, but which temperature point is considerably above the temperature utilized in the initial forming operation utilized in accordance with the process of the aforesaid Clapp et al. application Serial No. 543,499. The differential pressure utilized in the process of the present invention makes it possible to raise the temperature of the stretched sheet substantially above the temperature at which appreciable shrinkage would occur in the absence of the stretching forces brought into play by the pressure differential. Preferably, this pressure differential is obtained by a blowing operation in which low pressure compressed air (or other pressure fluid) is applied to the inner surface of the sheet, causing it to balloon out to the desired contour, although it will be readily understood to those skilled in the art that vacuum pressure could be utilized as an alternative, in which case the pressure of the atmospheric air would force the sheet in the opposite relative direction.

Referring now to the drawings, the process of the present invention will be described as applied to the production of a section of an aircraft canopy of compound curve configuration. The apparatus of this invention comprises a die generally indicated 15 and supported by legs 16. The die body comprises a solid bottom wall 17, generally rectangular in shape, and end walls 18 and 19, the end walls being generally hemispherical in shape. Structural rigidity of the die is obtained by means of the gussets 18a and I-beam members 18b. Extending completely about the peripheries of the end walls and the sides of the bottom wall is a plastic die member 20, the external surfaces of the die member lying in a single cylindrical surface of revolution.

Cooling means are provided for the die and, as shown in the drawings, these means may comprise the coolant jacket 32 which is connected to and contacts the die member 20, the jacket extending continuously around the entire area defined by the die member. Water or other coolant is continuously fed through the jacket 32 by means of inlet and outlet lines 33 and 34 and pump 35, the coolant being taken from the reservoir 36 and cooled in tower 37. Thus it is apparent that the entire peripheral edge portions of the sheet are cooled by contact with a water cooled surface and are thus maintained at a temperature below the boiling point of water, i.e., 212° F., and also below the temperature at which shrinkage of the stretched sheet occurs.

The die forms, with the part 40 to be formed, a pressure vessel, and means are provided for introduction of air or other fluid under pressure to the interior of the die for the blowing operation. As shown in the drawings, these means may comprise the low pressure air inlet line 41 which feeds into the end wall 19 and air outlet line 42 leading therefrom. An air diffuser, which may comprise the fabric member 43 connected to an opening in the end wall 19, is preferably provided to diffuse the incoming air and to prevent surges or blasts of air which might impinge upon the part being formed.

Means are provided for holding the part to be formed in place on the die during the forming operation and, as shown in the drawings, these means may include a plurality of conventional hold-down clamps 50. During the blowing operation these clamps are augmented by a steel clamping ring or frame 51 which is shaped to fit closely against the outer surfaces of the entire die member 20. Sealing means are provided for preventing leakage of the air or other pressure fluid from the assembly during the blowing operation. As shown in the drawings, these means may include the inflatable rubber or rubber-like seal 55 which is seated in a recess extending continuously about the die member 20. High pressure air is introduced to the inflatable seal through the line 56.

During the blowing operation, an auxiliary forming and retaining ring 60 is preferably utilized. This ring is rigidly but releasably connected to the die by means of the brackets 61, the ring being provided with an inner surface 62 which is contacted by a continuous portion of the part being formed and which is shaped to the contour of that portion of the finished part.

During the blowing operation it is often desirable to vary the rate of heating of the sheet being formed over predetermined localized areas thereof. One means of such heat control comprises a heat barrier comprising the fabric blanket 65, spaced from the sheet being formed. In the embodiment shown, the blanket is provided with a central opening 66 providing an unshielded area for direct application of heat to the ceneral portion of the part being blown.

In carrying out the process of the present invention, the die is preferably preheated to bring the entire mass thereof up to the desired forming temperature, several hours being required to accomplish this. Preferably, the flat stretched sheet 100 is also preheated. In some cases it is desirable to preheat the sheet to the initial forming temperature, but for best results the sheet should not be maintained at this temperature while in the flat condition for a length of time which would be sufficient to bring about substantial shrinkage. Generally it is sufficient to preheat the flat sheet at a temperature and for a length of time only to warm the surfaces thereof, purely to avoid any surface crazing of the material during the mechanical forming operation. In this case, the body of the sheet remains substantially at room temperature.

Figure 2:
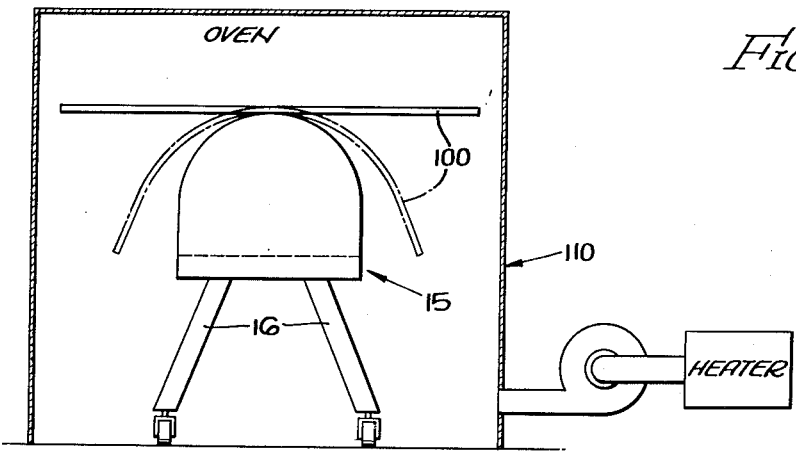
FIGURE 2 is a diagrammatic end elevation of the apparatus of the present invention, illustrating the second step in carrying out the process of the invention.

The first step in the process is illustrated in FIGURE 1, wherein the flat stretched sheet 100 is placed upon the die 15 as shown, the second step being illustrated in FIGURE 2 wherein the die and sheet are moved into an air circulating oven 110. At this point, the oven is preferably maintained at the desired initial forming temperature, i.e., a temperature at or slightly above the temperature at which "shrink-back" begins, as disclosed in said copending application Serial No. 543,499. For stretched "Plexiglas" 55 this temperature is about 215° F. The part is mechanically formed, i.e., it is bent or forced (as indicated by the phantom lines in FIGURE 2, which illustrates an intermediate stage) from the flat condition to a generally cylindrical condition, so that the periphery of the sheet contacts all outer surfaces of the die member 20, preferably before the entire body of the part has reached the desired initial forming temperature. It is possible to perform the initial forming operation while the entire part is cold, i.e., at room temperature, but such initial "cold" forming must be done with care and preferably only with parts which are thin relative to the radius of curvature of the formed contour.

This mechanical forming operation is preferably done by hand in relatively small successive increments to avoid damage to the sheet, and results in setting up stresses in the sheet as described in said copending application. Once the cylindrical contour has been reached, the clamps 50 are set (at this stage without the clamping ring 51), and the heating is continued to relieve the stresses and to "lock" the part in the formed shape, as is further disclosed in greater detail in said co-pending application.

The die and its part are then removed from the oven, cooled, the clamps removed, then the clamping ring 51, retaining ring 60, and thermal barrier 65 are applied, and the clamps re-set. The die and part are then placed back in the oven to be heated to the secondary (blowing) temperature. This temperature can be considerably higher than the critical initial forming temperature, since the shrink-back which might otherwise occur is prevented by the internal air pressure utilized during blowing. In fact, this pressure is sufficient to cause the piece to balloon out to the desired non-cylindrical contour. The actual secondary forming temperature should be maintained below the normal forming or thermoplastic temperature of the particular material being used, but in order to avoid the use of excessive pressures and to minimize the danger of leaks or "blow-outs," should be as high as possible. Generally, the secondary forming temperature should be lower than about 20° F. below the minimum normal thermoplastic temperature of the material being used, and preferably should be about 30° F. below such temperature. For "Plexiglas" 55, the preferred secondary forming temperature is about 270° F. The minimum temperature which can be utilized depends upon the type of part being formed, but temperatures as low as 240° F. have been used for forming "Plexiglas" 55. Such low temperatures required long (at least 16 hours) heating periods, however.

The internal air pressure, of roughly 5–15 p.s.i., is applied prior to and during heating, and during this time pressure is maintained in the inflatable seal, as well as circulation of coolant through the jacket 32. The die and the part are subjected to the temperature of the secondary forming operation for a sufficient length of time to bring the part to the desired contour.

It should be understood that the cooling step between the initial and secondary forming operations is not an essential feature of the process of the present invention, but is only dictated by the type of tooling, particularly the method of clamping utilized. The process may be carried out with automatic tooling systems which would render such cooling step unnecessary.

Figures 3, 5:
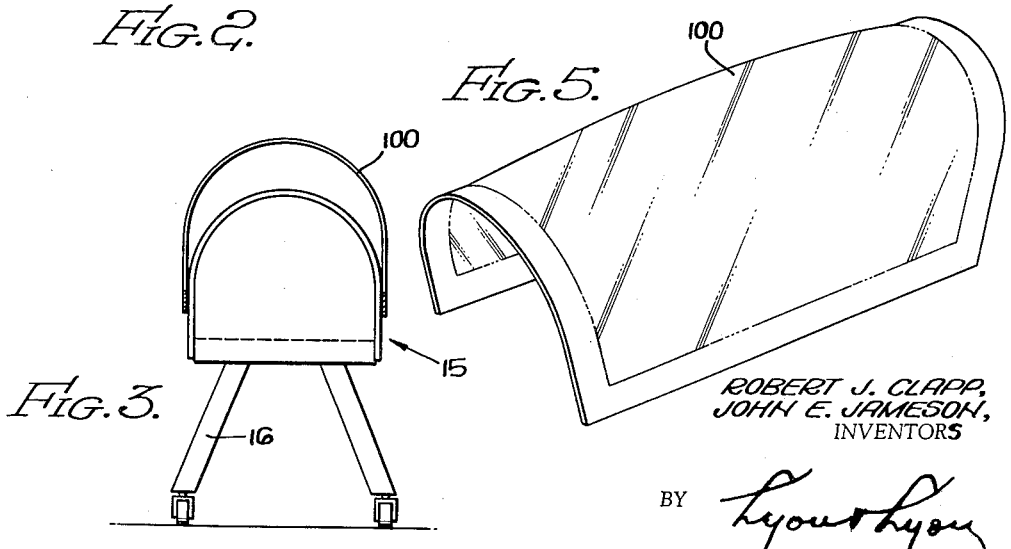
FIGURE 3 is a diagrammatic end elevation of the apparatus of the present invention, illustrating the third or blowing step of the process of the invention.
FIGURE 5 is a perspective view illustrating a part produced in accordance with the process and utilizing the apparatus of the present invention.
Figure 4:
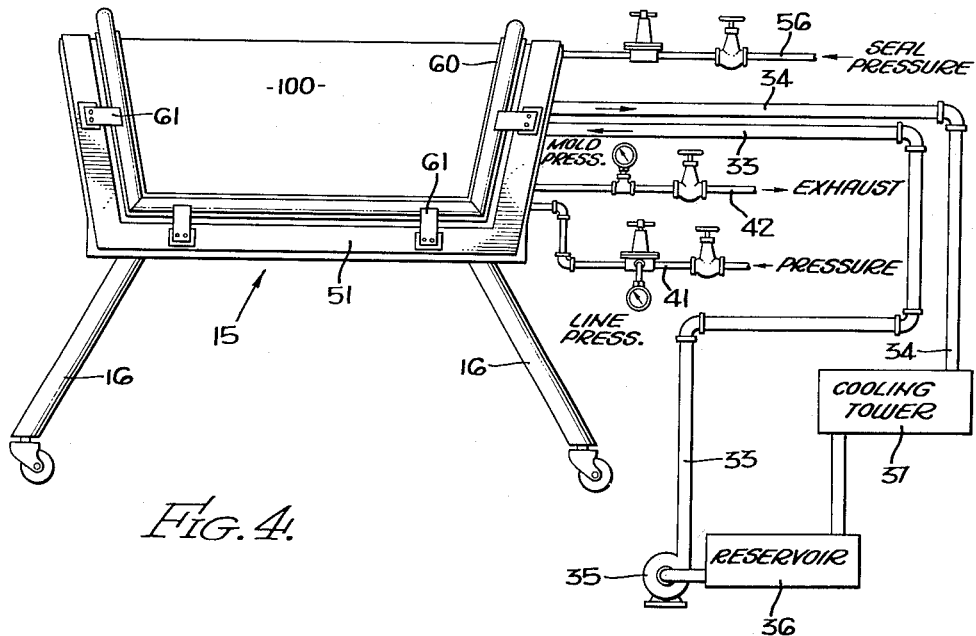
FIGURE 4 is a diagrammatic side elevation of the apparatus of the present invention.
Figure 10:
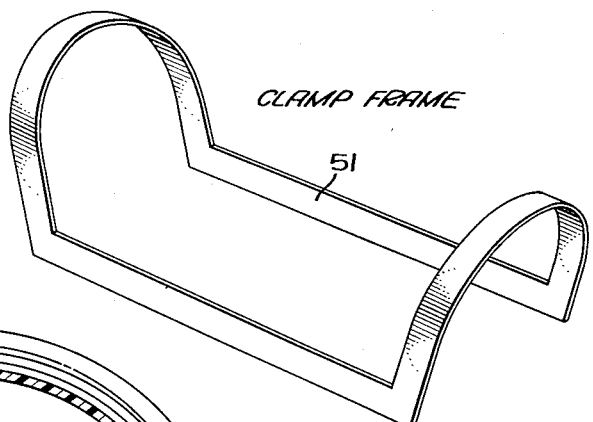
FIGURE 10 is a perspective view of the clamp frame portion of the apparatus.
Figure 11:
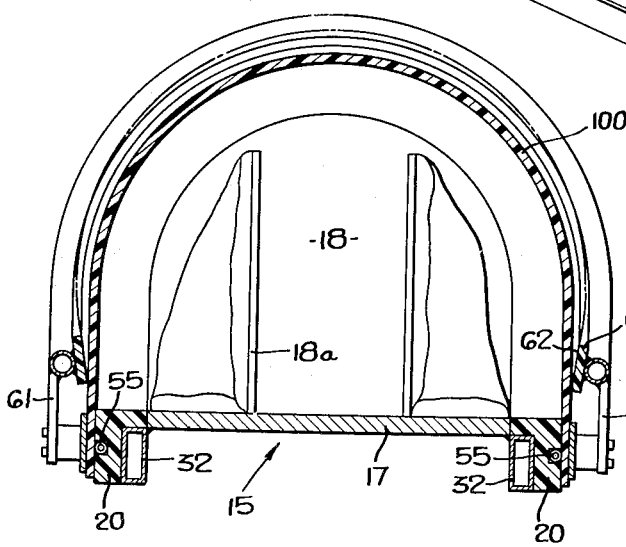
FIGURE 11 is a sectional view taken substantially on the line 11—11 of FIGURE 6.
Figure 7:
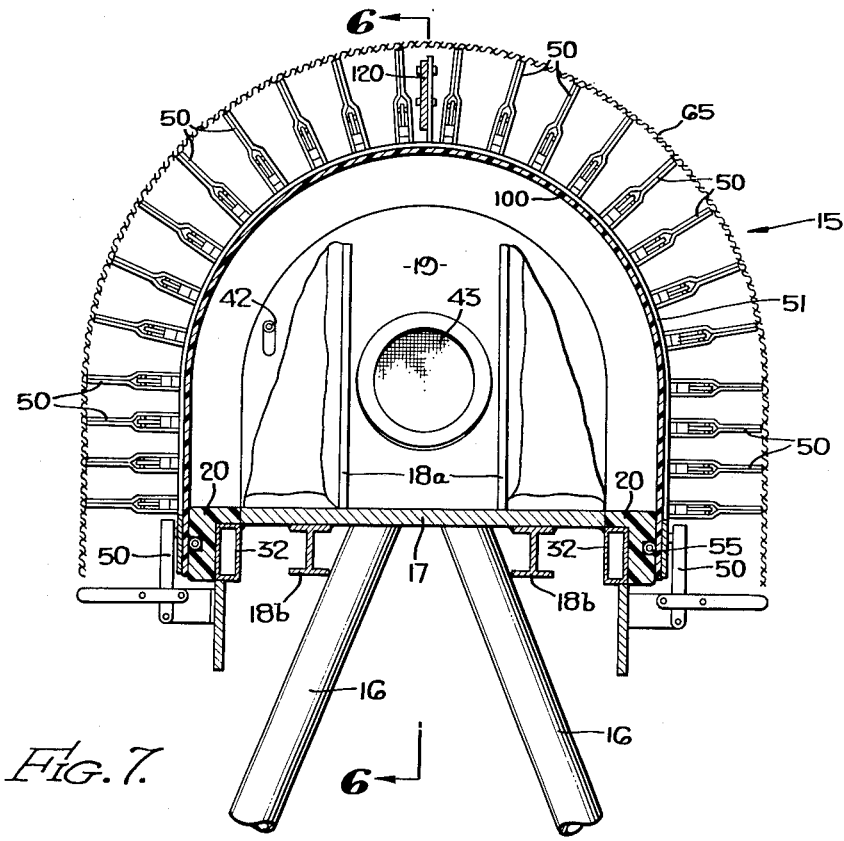
FIGURE 7 is a sectional elevation taken substantially on the line 7—7 of FIGURE 6.
Figures 8, 9:
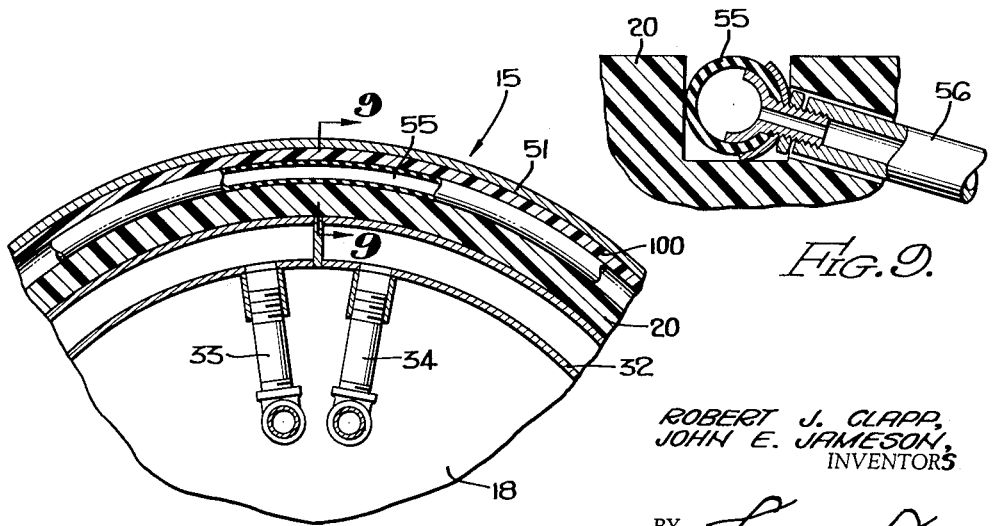
FIGURE 8 is a fragmentary sectional elevation taken substantially on the line 8—8 of FIGURE 6.
FIGURE 9 is a sectional elevation taken substantially on the line 9—9 of FIGURE 8.

After the part has been blown to the desired contour, which is preferably ascertained by means of a template 120 mounted above the die, the die and part are removed from the oven and allowed to cool. The finished part, shown in FIGURE 5, is then trimmed to remove the cylindrical end and side portions and then worked up in the usual manner for installation in an aircraft.

The following specific examples of the process are illustrative of the invention, but it is to be understood that the invention is not to be limited to the details set forth therein:

*Example 1*

A forward canopy section was formed from a blank of stretched "Plexiglas" 55 which was 69 inches long, 69 inches wide at the forward end, 78½ inches wide at the aft end, and having a thickness of 0.361 inch, as follows:

The mold 15 and the flat sheet were placed in the oven, as indicated in FIGURE 2, for two hours at an oven temperature of 215° F. While at this temperature, the sheet was slowly forced by hand to the cylindrical contours and clamped to the mold. Heating at 215° F. was continued for an additional two hours, whereupon the die and cylindrical part were removed from the oven and cooled to ambient temperature, while the part remained in the clamped condition.

The oven temperature was then set at 260° F. and the clamps released to permit attachment of the clamping ring 51, retaining ring 60, blanket shield 65, and template 120. In order to obtain the desired rate of heating of varying areas of the part, the blanket or thermal barrier 65 comprises 2 plies of flannel on the sides and forward and aft ends of the part.

Air pressure of 3 p.s.i. was applied to the interior of the die and inside of the clamped cylindrical sheet, and air pressure of 70 p.s.i. was applied to the inflatable seal. Circulation of water coolant was begun and the die assembly placed in the oven. During the first approximate twenty minutes, the blowing pressure was increased to 6 p.s.i., after about 50 minutes the pressure was slowly increased to 9 p.s.i., and after about an hour the pressure was increased to 12.5 p.s.i. Slowly increasing the pressure in successive increments, each pressure increase taking about 15 minutes, is an important step in the process, minimizing the danger of damage to the sheet from blow-out or sudden rushes of cold air. The part was in the oven for a total of 3 hours and 5 minutes, the average oven temperature being 268° F. As a result of this blowing operation, the part was brought to the desired contour, whereupon the assembly was removed from the oven and cooled to room temperature (this taking about 45 minutes) while maintaining the conditions of air pressure, water cooling and clamping the same as during the blowing operation. The part was then removed from the die, the cylindrical ends and sides trimmed off, and further processed in accordance with conventional practice.

*Example 2*

This part was a mate to be formed part of Example 1, comprising an aft canopy section formed from a blank of stretched "Plexiglas" 55 which was 51 inches long, 79 inches wide at the forward end, 66 inches wide at the aft end and having a thickness of 0.360 inch.

The initial forming operation was the same as the part of Example 1 and the secondary forming or blowing operation was also the same, except that the blowing pressure increments were 3, 5, 8 and 10 p.s.i., and the total time in the oven was 2 hours and 15 minutes.

*Example 3*

An inner canopy section was formed from a blank of stretched "Plexiglas" 55 which was 52 inches long, 72 inches wide at the forward end, 66 inches wide at the aft end, and having a thickness of 0.132 inch.

The initial forming operation was the same as in Example 1, except that for this thinner part, the total time in the oven was two hours. Forming was begun after 1 hour at the 215° F. temperature.

The blowing operation was the same as in Example 1, except that the rate of heating was controlled by constructing the barrier 65 of 2 plies of flannel forward, 8 plies aft, and 2 plies on the sides. The blowing pressure increments were 3, 5, and 7 p.s.i., and the total time in the oven was 50 minutes.

Example 4

The part formed here was the mate to the part of Example 3, being an outer canopy section formed from a blank of "Plexiglas" 55 which was 52 inches long, 72 inches at the forward end, 66 inches at the aft end and having a thickness of 0.255 inch.

The initial forming operation was the same as in Example 3, except that the total time in the oven was 3 hours, the forming having been begun after 1½ hours at the temperature of 215° F.

The blowing operation was the same as in Example 3, except that the blowing pressure increments were 3, 5, 8 and 10 p.s.i., and the total time at the temperature of 268° F. was 1 hour and 45 minutes.

Example 5

An inner windshield side panel section was formed from a blank of stretched "Plexiglas" 55 roughly triangular in shape, with a base of 34 inches and a height of 60 inches, and having a thickness of .130 inch. This part was formed without the initial preforming step set forth in Examples 1 through 4.

The part was shaped roughly in the form of a conic segment, but with a slight compound curvature. The overall length of the die was 47½ inches; the aft end of the die had a chord line 19 inches long; the length of the perpendicular line from the aft chord line to the deepest point of the die was 4 inches; the chord line at the forward end of the die was 2 inches; and the length of the perpendicular to the deepest point of the part from a straight line extending from the center of the forward edge to the center of the aft edge of the part was 1½ inches.

The sheet was clamped in the die at room temperature and the die was then placed in an oven at 270° F. Air pressure of 70 p.s.i. was applied to the inflatable seal, and circulation of water coolant was begun, and air pressure of 4 p.s.i. was applied to the interior of the die and inside of the clamped sheet. The restraining ring 60 and blanket shield 65 were attached to the die.

After 10 minutes the pressure was increased to 6 p.s.i.; after an additional 15 minutes the pressure was increased to 8 p.s.i.; after an additional 15 minutes to 10 p.s.i.; after an additional 15 minutes to 12 p.s.i. Heating was continued for an additional 45 minutes at 12 p.s.i. The part was in the oven under pressure for a total of one hour and forty minutes at an oven temperature of 270° F.

As a result of this blowing operation the part was brought to the desired contour whereupon the assembly was removed from the oven and cooled to room temperature, this taking about 45 minutes, while maintaining the conditions of air pressure, water cooling, and clamping the same as during the blowing operation. The part was then removed from the die and the excess material was trimmed off and the part processed in accordance with conventional practice.

Figure 12:
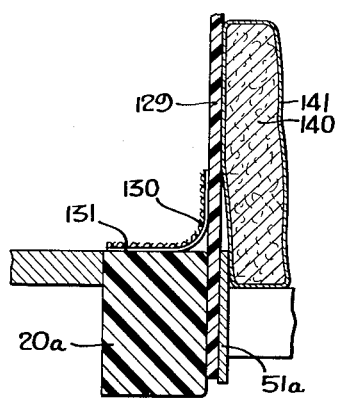
FIGURE 12 is a diagrammatic partial transverse sectional view illustrating a modified form of apparatus of the present invention.

A modified form of die is shown in FIGURE 12. This structure is generally the same as that described, including a die member 20a and a clamping ring 51a. Here, however, rather than using an inflatable seal, the plastic sheet 129 being formed is sealed to the die member by means of a seal comprsiing a web of Neoprene-impregnated nylon fabric 130 and an adhesive layer of zinc chromate 131. Additionally, a batt of fibrous insulation material 140 encased in aluminum foil 141 is used in place of the coolant jacket.

While the process of this invention has been described as particularly applied to the forming of acrylics, it will be understood that it is applicable to all thermoplastics which can be stretched, such as, for example, polystyrene.

Having fully described our invention, it is to be understood that we do not wish to be limited to the details set forth, but our invention is of the full scope of the appended claims.

We claim:
1. In a process for forming flat stretched thermoplastic sheet material of tough laminar structure into curved contours without substantial decrease in toughness of such material, the steps comprising: mechanically forming the sheet to a curved contour while imparting stresses therein, holding the sheet to said contour while heating the main body of the same to a temperature substantially below the thermoplastic temperature thereof and above the temperature at which appreciable shrinkage occurs while maintaining the entire peripheral edge portions of the sheet cooled to a temperature below that at which shrinkage occurs, applying a differential fluid pressure to opposed faces of said heated sheet to further form the same to a new contour while holding the cooled edge portions of the same against movement, and cooling said sheet while continuing to cool said edge portions, to apply said pressure and to hold the sheet to said new contour.

2. In a process for forming flat stretched thermoplastic sheet material of tough laminar structure into curved contours without substantial decrease in toughness of such material, the steps comprising: mechanically forming the sheet to a curved contour while imparting stresses therein, holding the sheet to said contour while heating the main body of the same to a temperature substantially below the thermoplastic temperature thereof and above the temperature at which appreciable shrinkage occurs while maintaining the entire peripheral edge portions of the sheet cooled to a temperature below that at which shrinkage occurs, selectively shielding portions of said sheet to control the rate of heating thereof, applying a differential fluid pressure to opposed faces of said heated sheet to further form the same to a new contour while holding the cooled edge portions of the same against movement, and cooling said sheet while continuing to cool said edge portions, to apply said pressure and to hold the sheet to said new contour.

3. In a process for forming flat stretched thermoplastic sheet material of tough laminar structure into curved contours without substantial decrease in toughness of such material, the steps comprising: mechanically forming the sheet to a curved contour while imparting stresses therein, holding the sheet to said contour while heating the same to a temperature sufficiently high and for a sufficient length of time to substantially remove stresses imparted to the sheet during said forming step, but below the temperature at which appreciable shrinkage occurs, heating the main body of the sheet to a higher temperature, but substantially below the thermoplastic temperature thereof while maintaining the entire peripheral edge portions of the sheet cooled to a temperature below that at which shrinkage occurs, applying a differential fluid pressure to opposed faces of said heated sheet to further form the same to a new contour while holding the cooled edge portions of the same against movement, and cooling said sheet while continuing to cool said edge portions, to apply said pressure and to hold the sheet to said new contour.

4. In a process for forming flat stretched thermoplastic sheet material of tough laminar structure into curved contours without substantial decrease in toughness of such material, the steps comprising: mechanically forming the sheet to a curved contour while imparting stresses therein, holding the sheet to said contour while heating the same to a temperature sufficiently high and for a sufficient length of time to substantially remove stresses imparted to the sheet during said forming step, but below the temperature at which appreciable shrinkage occurs, heating the main body of the sheet to a higher temperature, but substantially below the thermoplastic temperature thereof while maintaining the entire peripheral edge portions of the sheet cooled by contact with a water cooled surface, applying a differential fluid pressure to opposed faces of said heated sheet to further form the same to a new contour while holding the cooled edge portions of the same against movement, and cooling said sheet while continuing to cool said edge portions, to apply said pressure and to hold the sheet to said new contour.

5. In a process for forming flat stretched thermoplastic sheet material of tough laminar structure into curved contours without substantial decrease in toughness of such material, the steps comprising: mechanically forming the sheet to a curved contour while imparting stresses therein, holding the sheet to said contour while heating the same to a temperature sufficiently high and for a sufficient length of time to substantially remove stresses imparted to the sheet during said forming step, but below the temperature at which appreciable shrinkage occurs, heating the main body of the sheet to a high temperature, but substantially below the thermoplastic temperature thereof while maintaining the entire peripheral edge portions of the sheet cooled to a temperature below that at which shrinkage occurs, applying air under pressure to one side of the hot sheet to further form the same to a new contour while holding the cooled edge portions of the same against movement, and cooling said sheet while continuing to cool said edge portions, to apply said pressure and to hold the sheet to said new contour.

6. In a process for forming flat stretched, cross-linked polymethyl methacrylate sheet material into curved contours, the steps comprising: mechanically forming the sheet to a curved contour while imparting stresses therein, holding the sheet to said contour while heating the same at a temperature of about 215° F. for a sufficient length of time to substantially remove stresses imparted to the sheet during said forming step, heating the main body of the sheet at a temperature of about 270° F. while maintaining the entire peripheral edge portions of the sheet cooled at a temperature below 212° F., applying a differential fluid pressure to opposed faces of said heated sheet to further form the same to a new contour while holding the cooled edge portions of the same against movement, and cooling said sheet while continuing to cool said edge portions, to apply said pressure and to hold the sheet to said new contour.

7. In a process for forming flat stretched thermoplastic sheet material of tough laminar structure into curved contours without substantial decrease in toughness of such material, the steps comprising: mechanically forming the sheet to a curved contour while imparting stresses therein, holding the sheet to said contour while heating the same to a temperature sufficiently high and for a sufficient length of time to substantially remove stresses imparted to the sheet during said forming step, but below the temperature at which appreciable shrinkage occurs, heating the main body of the sheet to a higher temperature, but substantially below the thermoplastic temperature thereof while maintaining the entire peripheral edge portions of the sheet cooled to a temperature below that which shrinkage occurs, selectively shielding portions of said sheet to control the rate of heating thereof, applying a differential fluid pressure to opposed faces of said heated sheet to further form the same to a new contour while holding the cooled edge portions of the same against movement, and cooling said sheet while continuing to cool said edge portions, to apply said pressure and to hold the sheet to said new contour.

8. In a process for forming flat stretched thermoplastic sheet material of tough laminar structure into curved contours without substantial decrease in toughness of such material, the steps comprising mechanically forming the sheet to a curved contour while imparting stresses therein, holding the sheet to said contour while heating the same to a temperature sufficiently high and for a sufficient length of time to impart a small amount of shrink-back to the sheet, said shrink-back corresponding to a measurable amount of shrinkage in a flat specimen of said stretched sheet subjected to the same temperature conditions as said contoured sheet, but below the temperature at which more than about 3 percent shrinkage of said flat specimen occurs, cooling said sheet while continuing to hold the sheet to said contour, heating the main body of the sheet to a higher temperature, but substantially below the thermoplastic temperature thereof while maintaining the entire peripheral edge portions of the sheet cooled to a temperature below that at which shrinkage occurs, applying a differential fluid pressure to opposed faces of said sheet to further form the same to a new contour while holding the cooled edge portions of same against movement, and cooling said sheet while continuing to cool said edge portions, to apply said pressure and to hold the sheet to said new contour.

9. In a process for forming flat stretched, cross-linked polymethyl methacrylate sheet material into curved contours, the steps comprising: mechanically forming the sheet to a curved contour while imparting stresses therein, holding the sheet to said contour while heating the same at a temperature of about 215° F. for a sufficient length of time to set the sheet in the curved contour and to impart a small amount of shrink-back to the sheet, said shrink-back corresponding to a measurable amount of shrinkage, but not more than about 3 percent, in a flat specimen of said stretched sheet subjected to the same temperature conditions as said contoured sheet, cooling said sheet while continuing to hold the sheet to said contour, heating the main body of the sheet at a temperature of about 270° F. while maintaining the entire peripheral edge portions of the sheet cooled at a temperature below 212° F., applying air under pressure to one side of the hot sheet to further form the same to a new contour while holding the cooled edge portions of same against movement, and cooling said sheet while continuing to cool said edge portions, to apply said pressure and to hold the sheet to said new contour.

10. The process of claim 1 wherein the differential fluid pressure moves portions of said sheet adjacent the peripheral edge portions thereof into contact with a forming and retaining ring shaped to the contour of the finished part.

11. The process of claim 2 wherein the differential fluid pressure moves portions of said sheet adjacent the peripheral edge portions thereof into contact with a forming and retaining ring shaped to the contour of the finished part.

12. The process of claim 3 wherein the differential fluid pressure moves portions of said sheet adjacent the peripheral edge portions thereof into contact with a forming and retaining ring shaped to the contour of the finished part.

13. The process of claim 7 wherein the differential fluid pressure moves portions of said sheet adjacent the peripheral edge portions thereof into contact with a forming and retaining ring shaped to the contour of the finished part.

14. The process of claim 8 wherein the differential fluid pressure moves portions of said sheet adjacent the peripheral edge portions thereof into contact with a forming and retaining ring shaped to the contour of the finished part and wherein selected portions of the sheet are shielded to control the rate of heating thereof.

References Cited in the file of this patent
UNITED STATES PATENTS

| | | |
|---|---|---|
| 2,282,423 | Kopitke | May 12, 1942 |
| 2,444,420 | Borkland | July 6, 1948 |
| 2,468,697 | Wiley | Apr. 26, 1949 |
| 2,749,572 | Nowak | June 12, 1956 |
| 2,759,217 | Peterson | Aug. 21, 1956 |
| 2,784,457 | Dunmire | Mar. 12, 1957 |